May 12, 1936.　　　　H. A. COURMETTES　　　　2,040,242
METHOD AND MEANS FOR SURFACING SOLID BIFOCAL LENSES
Filed May 23, 1932
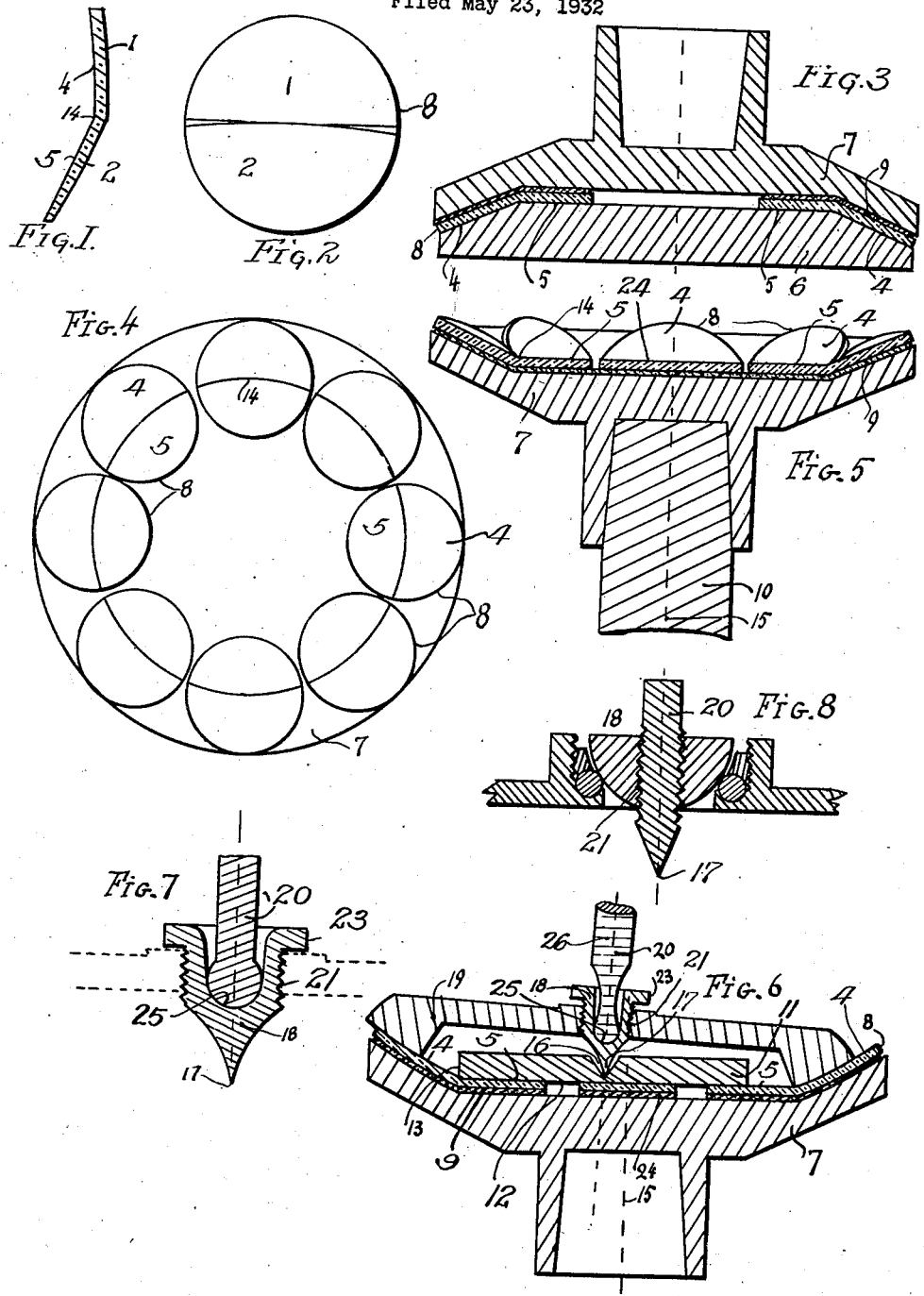
INVENTOR
Henry A. Courmettes Patented May 12, 1936

2,040,242

UNITED STATES PATENT OFFICE 2,040,242

METHOD AND MEANS FOR SURFACING SOLID BIFOCAL LENSES

Henry A. Courmettes, Brooklyn, N. Y.

Application May 23, 1932, Serial No. 612,971

4 Claims. (Cl. 51—131)

This method is applicable to the grinding of certain optical lenses which have two differently curved areas upon one surface and more especially for the surface grinding of a new bifocal lens wherein the two fields are angled in respect to each other; it permits the simultaneous surface grinding of a number of lenses upon their differently curved inner surfaces at one time, requiring only one blocking for this operation; the parts used are capable of adjustments heretofore not used in the art.

The method being intended primarily for grinding the inner surfaces of the bifocal lens referred to, whereupon the said inner surfaces are inclined toward each other, consists particularly in; mounting or blocking a number of glass blanks upon their backs on the peripheral surface of a circular lens holder, the shank of which is made to fit the spindle of surface grinding machines; surfacing the upper and corresponding inner bifocal surfaces of all the lenses on the lens holder by means of an annular grinding tool of sufficient diameter to cover and grind part of each of the said surfaces, said annular tool being fitted with a device serving as a pivotal center of rotation, which also carries a secondary pivotal point used as a center of rotation for a second surfacing tool located directly under the annular grinder; surfacing the lower and corresponding inner bifocal surfaces of all the lenses, by means of a surfacing tool of such diameter as to reach and cover part of each lens and of such thickness as to pass between the revolving lenses and the larger annular grinding tool; maintaining the proper relation of position of the two grinding tools to obtain a line of junction of the two inner bifocal surfaces of the lens free from steps or ridges, by means of the two aforesaid grinding tools and an adjustable device secured thereto, serving as a double pivotal center of rotation and separating the two tools to the exact space required; and completing the surface grinding process while revolving the grinding tools eccentrically to the center of rotation of the lenses.

The superimposed grinding tools and the adjustable pivotal center being the means by which the multiple and simultaneous surfacing is obtained.

Reference is made to the drawing herewith forming a part of this invention and in which similar numbers refer to similar parts throughout and in which;

Fig. 1 is a sectional side view of the particular form of lens for the grinding of which this invention is intended.

Fig. 2 is a face front elevation of a similar lens, showing the straight transversal line created by the similar outside surfaces and the transversal downward curve created by unsimilar curves ground upon the inner surfaces.

Fig. 3 is a sectional side elevation of a lower circular matrix block serving as a glass blank rest, an upper circular lens holder with cementing or blocking material upon a portion of its face, and the glass blanks secured thereto.

Fig. 4 is a top face view of the lens holder and lenses cemented thereto at regular intervals in a circular position.

Fig. 5 is a sectional side elevation of the lens holder showing the lenses in position for grinding, and the standard shaped shank.

Fig. 6 is a sectional side elevation of the assembly in operation; showing the upper annular grinding tool, the adjustable pivotal center screwed thereto, the lower grinding tool, the glass blanks and the lens holder.

Fig. 7 is a sectional side view of the device for rotating the two grinding tools upon one common axis and to maintain the proper separation of the said tools.

Fig. 8 is a sectional side elevation of a similar adjustable device, but of the ball bearing type.

Glass blanks which have been previously shaped by heating and pressing into a mould while in a molten state to approximately the form of the finished surfaces of the lens as in Figs. 1 and 2 are used in this description of the method.

The blanks 8 Fig. 4 are placed face down upon a matrix block 6 Fig. 3 in a position giving closest contact of the surfaces 4 and 5 Fig. 3 to the block and in a circular position at regular intervals as shown in Fig. 4; eight of such glass blanks of 54 m/m diameter being possible at one time, depending upon their curvatures and angles of the two fields 1 and 2 Fig. 2. A circular lens holder 7 shaped to conform to the contours of the lens blanks 8 and the matrix block 6, is heated and the face of it covered with blocking pitch 9 or other cementing substance and applied while hot to the lens blanks. The lens holder 7, lens blanks 8 and matrix block 6 are held together as in Fig. 3 until the blocking cement 9 has cooled and hardened to hold the blanks securely in place. The lens holder 7 is then set upon a surfacing spindle 10 Fig. 5, preferably a self centering ball bearing spindle, turning as accurately and true as possible; a circular surfacing tool 11 Fig. 6 having a predetermined curved grinding surface 12 and of such diameter as to cause the edge 13 of the tool to reach the line of demarcation 14 on the glass blanks 8 when revolving eccentrically to the axis 15 of the surfacing spindle 10, is laid upon the surfaces 5 of the lens blanks; this surfacing tool 11 is provided with a correctly centered pivotal hole 16 into which the point 17 of the adjustable device 18 rests. Then, an annular surfacing tool 19 Fig. 6, also of predetermined curvature and of diameter computed to grind the entire upper surface 4 of the lens blanks when revolving upon the same axis of rotation as that of the first surfacing tool 11 but eccentric to the axis 15 of the spindle 10, is laid over the smaller surfacing tool 11 and in contact with the lens surfaces 4; the pin 20 of the surfacing machine is lowered into the adjustable center 18 and held rigidly at a measured distance from the axis 15 of the surfacing spindle and in this position the grinding proceeds, first with grinding material of medium grain until all surfaces are entirely roughed out; during the process close examination reveals whether the surfaces meet evenly at their line of junction 14, if a ridge is left, an adjustment of the screw 21 to sink or raise the tool 11 is readily made, as necessary, by means of the hexagon nut 23 of the centering device 18; the finer grinding materials are then used and the adjusting repeated if necessary until the lenses are ready for polishing; this is done by applying a polishing material to the faces of the surfacing tools, being careful not to overlap their edges and revolving same over the lenses exactly as in the grinding process. A piece of glass 24 cemented in the center of the lens holder 7 is often a help in maintaining the curvature and balancing the pressure on the surfaces 5 ground by the small surfacing tool.

During the process it is sometimes necessary to use only one of the surfacing tools at the time; this method lends itself to this use as well.

Instead of revolving the surfacing spindle as described, the grinding process may be varied by maintaining the lens holder in a fixed position and revolving the grinding tools by the upper pin of the surfacing machine, which is then secured and moved around eccentrically, to an upper driving axle. In this case the grinding tools still have a common pivotal and radial axis and therefore this method is also understood to come within the claims of this invention.

The thimble member 18, shown in Figs. 6 and 7, is understood to provide means for maintaining two superimposed lens surfacing laps in a common axis of rotation, first, by its pointed pin 17 which is held in the conical shaped center 16 of lap 11 through pressure imparted by pin 20, second, by its hollow shaped center 25 into which the rounded end of pin 20 rests, and third, by its circular threaded wall 21 which secures it to the upper lap 19. The pointed pin 17 provides the universal and pivotal motion for lap 11, the hollow shaped center 25 provides the universal and pivotal motion for lap 19, the threaded wall 21 provides means to adjustably secure member 18 to lap 19 relatively to the surfaces 4 and 5 of the lenses 8; the center 25 and pin 17 having the same common axial center, as shown by vertical broken line 26 in Fig. 7, provide the means to maintain a common axis of rotation for both laps 11 and 19, and the nut head 23 integral with member 18, serves to regulate said member in lap 19.

Although numerous variations of the forms of pivotal centers and shapes of grinding tools may be devised, I am anticipating those intended to obtain the same result, it being sufficient that the two grinding tools have a common axis of rotation, that one of these be provided with an adjustable centering device supplying a pivotal center for both tools, and that said adjustable centering device be provided with means to keep both tools at a correct and controllable distance from each other.

Having thus described my invention for the special grinding of the lenses referred to, I claim:

1. A device for maintaining two superimposed lens surfacing laps in a common axis of rotation and comprising; a universal bearing joint serving as pivotal center for one of said laps; a pointed pin serving as a pivotal center for the second lap, and means to adjustably secure said device relatively to the level of the grinding surfaces of the said laps.

2. A device to aid in surfacing solid bifocal lenses and to hold two lens surfacing laps in a substantially common axis of rotation, consisting of a onepiece member shaped to comprise a pivot pin, an internal pivot center co-axial with said pivot pin, an external threaded wall, and a screw-nut head, as set forth.

3. A device to aid in surfacing the bifocal lens referred to and comprising, in combination, two superimposed surfacing laps having a common axis of rotation and independent pivotal centers; a member engaging said surfacing laps and providing a pointed pin serving as guide for one of the surfacing laps, an internal pivot center co-axial with said pointed pin and serving as pivotal center for the second lap, an external screw-threaded wall to secure said member to one of the laps, and a screw-nut head to adjust said member into the said second lap; and the abrading surface of the superposed surfacing lap being annular in shape and spherical in curvature.

4. A device to aid in surfacing the solid bifocal lens referred to and comprising, in combination, two superimposed surfacing laps having a common axis of rotation, and a member engaging the said laps and providing means to adjustably control the separation between the said laps relative to their grinding surfaces, said member also providing separate pivotal centers for both of said laps, as set forth.

HENRY A. COURMETTES.